(No Model.)
M. KATZNER, J. RUSSELL & T. CHASE.
ROAD CART.
No. 375,164. Patented Dec. 20, 1887.
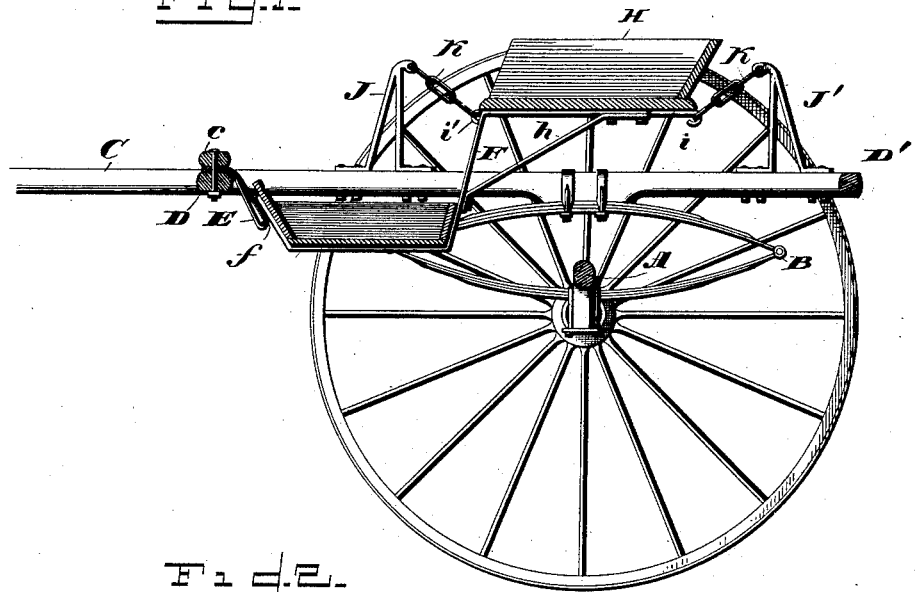
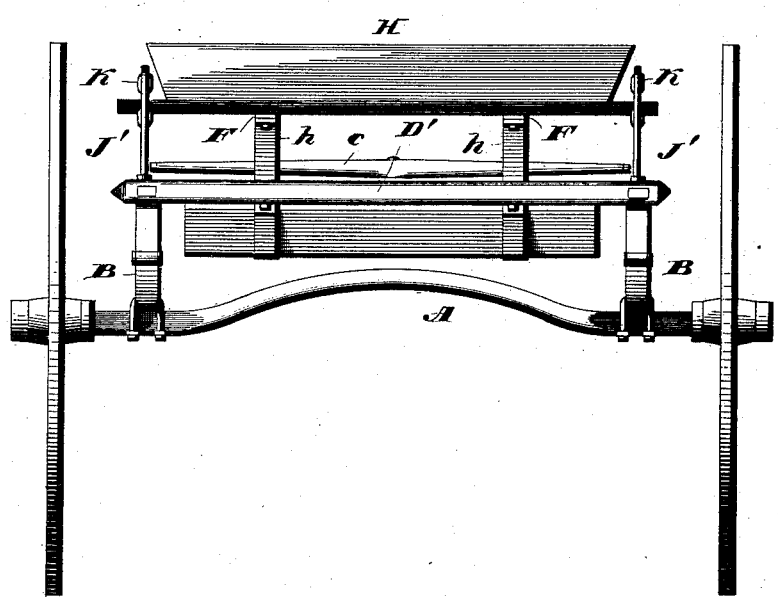
WITNESSES
G. S. Elliott
W. Johnson
Michael Katzner
John Russell
Thomas Chase.
INVENTOR
Attorney

UNITED STATES PATENT OFFICE.

MICHAEL KATZNER, JOHN RUSSELL, AND THOMAS CHASE, OF MARYSVILLE, CALIFORNIA.

ROAD-CART.

SPECIFICATION forming part of Letters Patent No. 375,164, dated December 20, 1887.

Application filed August 4, 1887. Serial No. 246,133. (No model.)

*To all whom it may concern:*

Be it known that we, MICHAEL KATZNER, JOHN RUSSELL, and THOMAS CHASE, citizens of the United States of America, residing at Marysville, in the county of Yuba and State of California, have invented certain new and useful Improvements in Road-Carts; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to certain new and useful improvements in two-wheel vehicles, the object being to provide a cheap and easy riding vehicle which will be simple in construction; and our invention relates, especially, to the means employed for mounting the body upon the thills.

In the accompanying drawings, which illustrate our invention, Figure 1 is a vertical sectional view of a road cart or sulky constructed in accordance with our improvement. Fig. 2 is a rear view.

In the accompanying drawings, A refers to the axle, which has preferably an upward curve at its center; and to this axle, adjacent to the ends thereof, which are rectangular in cross-section, elliptical springs B B are rigidly clipped, these springs being of ordinary construction. To the upper center portion of the springs B B are rigidly clipped the rear ends of the thills C, these thills being connected to each other by cross-bars D and D'. The portion of the thill C between the cross-bars D and D' is slightly enlarged, so as to provide a bearing for the elliptical springs, which are rigidly secured to the thills, and above the cross-bar D is pivotally attached the singletree c. At a suitable distance from the center of the front cross-bar, D, are attached flexible loops E E, which serve to support the front portion of the body of the vehicle.

The seat and foot-rest of the body of the vehicle are connected to each other by straps F F, which are provided at their front portions with staples f, with which the loop E engages. These straps F F pass around the front under side of the rear portion of the foot-rest, and extend upwardly and rearwardly from the rear portion to the under side of the seat H, to which they are rigidly bolted. These supporting straps or bars have braces h, which extend from the rear under side of the seat to the rear portion of the foot-rest, so as to rigidly brace the parts to each other. The rear ends of the straps or bars F are formed into hooks i, while suitable hooks or staples are attached to the same immediately under the front edge of the seat, as shown at i'.

To the upper edges of the thills C C are secured brackets J and J', which extend upwardly from the thills to a point above the bottom board of the seat, and to the eyes formed in the upper ends of these brackets short chains K are secured, the ends of these chains engaging with the staple and hook i and i'. By this construction it will be seen that the body of the vehicle is supported so as to have an oscillatory movement both front and rear and laterally, so that the movement of the horse which is imparted to the thills and axle will not be communicated to the seat.

If desirable, and in some cases we prefer, instead of attaching the staples i and i' to the straps F F, to attach them to the end board of the seat-straps, which have hooks formed in their ends for engaging with the chains K, and we do not wish to confine ourselves to the location of the hooks which engage with the chain-support to the bracket.

If desirable, the loops E, which are attached to the front cross-bar, may be made so as to be adjustable, so as to raise or elevate the front portion of the body of the vehicle to suit persons of different weights.

We claim—

The combination, substantially as described, of the axle, the thills, springs interposed between the axle and thills and rigidly secured to both, cross-bars D D', bracket secured to the thills, the seat suspended at front and rear from the brackets by flexible connections, metal straps depending from the front of the seat and extended forward, flexible loops connecting the forward ends of said straps to cross-bar D, and the foot-rest secured to and supported by the forwardly-extending ends of the straps.

In testimony whereof we affix our signatures in presence of two witnesses.

MICHAEL KATZNER.
JOHN RUSSELL.
THOMAS CHASE.

Witnesses:
LOUIS WALTHERS,
CHAS. L. HUNT.